United States Patent [19]

Rogers

[11] Patent Number: 4,642,646
[45] Date of Patent: Feb. 10, 1987

[54] AUTOMATIC SENSITIVITY ADJUSTMENT AND AUDIO MUTING FOR AIRCRAFT MARKER BEACON RECEIVER

[76] Inventor: Noel A. Rogers, 9121 W. 70th St., Shawnee Mission, Kans. 66204

[21] Appl. No.: 619,808

[22] Filed: Jun. 12, 1984

[51] Int. Cl.$^4$ ............................................. G01S 1/04
[52] U.S. Cl. ................................................... 342/407
[58] Field of Search ............. 343/5 LS, 5 GC, 7 AG, 343/410–413, 401, 407; 455/35, 221, 249, 250; 340/952

[56] References Cited

U.S. PATENT DOCUMENTS 3,325,738  6/1967  Busby et al. ..................... 455/221 X
4,048,567  9/1977  Yamatani ........................ 455/249 X Primary Examiner—Theodore M. Blum
Assistant Examiner—Mark Hellner
Attorney, Agent, or Firm—Schmidt, Johnson, Hovey & Williams

[57] ABSTRACT

An improved aircraft marker beacon receiving and indicating system is provided, which automatically responds to the amplitude of the received signals to provide reduced sensitivity and muting of audio output after initial sensing and indication of proximity to the beacon and during a timed period of passing over the beacon in closest proximity thereto. The improved system employs an electrically controllable radio frequency attenuator between the antenna and the input of the receiver. The attenuator is controlled by a control voltage of predetermined duration from a trigger actuated, timed control signal generator. The control signal generator is triggered by direct current trigger pulse signals from an audio frequency peak detector. The peak detector derives its input from an operational amplifier coupled to receive audio frequency signals from the demodulator output of the tuner portion of the receiver. The control voltage from the timed control signal generator is applied to the reference input terminal of the operational amplifier to mute the loudspeaker or headphones coupled with the output of the operational amplifier, as well as to the attenuator to reduce the sensitivity of the receiver.

7 Claims, 3 Drawing Figures

AUTOMATIC SENSITIVITY ADJUSTMENT AND AUDIO MUTING FOR AIRCRAFT MARKER BEACON RECEIVER

BACKGROUND OF THE INVENTION

1. Field of the Invention

This invention relates to aircraft marker beacon receiving and indicating systems and, more particularly, to improvements thereof for enhancing safety and convenience during instrument landings by decreasing the distractions and burden of functions heretofore manually performed by the pilot during such critical and busy phase of flight. The improved system provides automatic control over the functionas of reducing receiver sensitivity and muting of the audio output from the receiver, which is desirable and customarily done manually once the general proximity to a beacon has been sensed and indicated and during that period that the aircraft is merely completing its passage over the beacon.

2. Description of the Prior Art

The most relevant known prior art, the problems it leaves unsolved and the distinctions between the present invention and what has heretofore long been conventional standard practice in connection with the relatively specialized field of technology involved can all be best understood by initially considering a typical aircraft marker beacon receiving and indicating system of the conventional type now in almost universal use and the manner in which it is typically operated during an instrument landing. For that purpose, such a system has been shown in FIG. 1 of the drawings, to which reference will be made as this explanation proceeds.

Attention and appropriate action by the pilot of an aircraft during an instrument landing is required with respect to a number of different instrument outputs, aircraft conditions, weather conditions, air traffic conditions, and the demands of radio communication with an airport control tower; moreover, the pilot must mentally integrate information from a plurality of such sources with great rapidity in order to take the proper actions at the proper times for successfully executing the instrument landing. The relevant instruments to be monitored during the final glide slope phase of an instrument landing include the altimeter, the airspeed indicator, the rate of descent indicator, the engine and other aircraft indicating instruments, the communications radio and various navigational aid instruments for indicating the direction and distance of the aircraft from the runway. Among the latter are the indicator lights and audible signals provided by three ground-based marker beacon radio transmitters disposed at intervals along the glide slope path aligned with a runway. The inner beacon is located at or closely adjacent the end of the runway, and, although the exact distances may vary from airport to airport, the outer beacon is typically located no more than four miles from the inner beacon, with the middle marker therebetween.

Each of the beacons transmits radio signals upwardly in a generally conical pattern. The beacons are sufficiently displaced from each other along the ground and their radiation patterns are sufficiently well defined that their respective signals will be received successfully by an aircraft proceeding along the proper glidepath. The radiation patterns of the beacons are restricted in extent such that an aircraft traveling at glidepath speed, regardless of size and type of engine, will typically enter, traverse and leave the zone of reception for signals from a given beacon within less than 15 seconds. The radiation patterns of the beacons are also stronger in the inner more vertical portion of their conical extent than in the outer portions thereof, so that the signals therefrom will be received with a much greater signal strength by an aircraft which is substantially directly over a beacon than when the aircraft is approaching or leaving the beacon. The signals transmitted by each of the beacons is a radio frequency carrier of about 75 mHz, amplitude modulated by distinctive Morse code pulse groups of an audio frequency which is different for each of the three beacons (400 Hz for the outer beacon, 1300 Hz for the middle beacon and 3000 Hz for the inner beacon). After separation of such modulation signals from the carrier by demodulating detection in the tuner portion of an aircraft receiver, the signals emanating from each beacon are distinguishable both audibly and by electrical filtering.

In general, such marker beacon signals are presented to the pilot of an aircraft in two ways—first, as an audible output on a loudspeaker in the cockpit area (or on earphones worn by the pilot), and secondly, by the illumination of one of three panel lights respectively corresponding to the three beacons (a blue light for the outer beacon, an amber light for the middle beacon and a white light for the inner beacon). As the aircraft proceeds down the glidepath toward the runway, the successive reception and presentations of the signals from each beacon provide the pilot with confirmation that the aircraft is directionally on the glidepath to the runway, but, primarily are used to provide the pilot with an indication of the distance of the aircraft from the end of the runway and a means of assuring that the aircraft is elevationally on the glidepath prescribed for the involved airport (which is defined for each airport in terms of the altitude at which the aircraft should be as it passes over the center of each of the outer and middle markers). Typically, an aircraft is required to be at an altitude of less than 1000 feet over the outer marker, less than 500 feet over the middle marker and in condition ready for touchdown over the inner marker, with the entire traversal of the glidepath between the outer and inner markers usually lasting no more than a minute for commercial jet aircraft.

The nature of the marker beacon signals, the type of information available therefrom and the manner in which such information needs to be utilized inherently create two types of problems.

First, the level of required concentration and activity of the pilot during the final glideslope phase of an instrument landing is so high that any unnecessary distraction or interference with other activities caused by the marker beacon system is intolerable; such distraction and interference would arise from continuance of the audible output over the loudspeaker or pilot's earphones (which may also be needed for communication with the control tower) of the coded tone signals from a marker beacon during the entire traversal of its radiation pattern by an aircraft, whereas such audible signals are really needed only momentarily to alert the pilot to the fact that the aircraft has entered the radiation pattern overlying a particular beacon (the identity of the beacon being traversed thereafter being readily ascertainable from reference to which of the three indicator lights is lit). The practical solution typically followed by pilots for dealing with such first problem is to manually open the switch connecting the marker beacon receiver with the loudspeaker or headphones, once entry into the reception area for a particular beacon has been noted, with the intention of reconnecting the beacon receiver with the audio transducer before the reception area for the next beacon will be reached—unfortunately, the latter restorative step may be overlooked or not feasible because of the press of other activities.

Secondly, presuming that the marker beacon receiver in an aircraft is being operated at a sensitivity to radio frequency signals sufficient to commence receiving the signals from a given beacon as soon as the aircraft enters the outer portion of the radiation pattern of such beacon, no definite indication would be provided to the pilot as to when the aircraft has reached a position substantially directly above the beacon (which is when the check for altitude being at the prescribed level needs to be made). The imperfect solution for such second problem has been for aircraft marker beacon receivers to be provided with a manual switch to be opeated by the pilot, once entry into the reception zone for a given beacon has been indicated, for temporarily descreasing the sensitivity of the receiver, so that the indicator lights (and audible output device, if it has not been turned off) will provide a reliable indication of when the aircraft has proceeded to a position substantially over the central part of the beacon's radiation pattern (at which the radiated signals are strongest)—but this conventional expedient, requiring two manual switch operations by the pilot for each of the outer and middle beacons, is subject to the same shortcomings as noted in connection with intended temporary deactivations of the loudspeaker, and a further operational disadvantage has arisen from the manner in which prior marker beacon systems have implemented such manual control over receiver sensitivity, as hereinafter explained.

Specific reference is now made to FIG. 1 of the drawings, in which a typical prior aircraft marker beacon receiver system is depicted in block diagram form. The marker beacon signal antenna 10 of the aircraft is coupled as at 12 to the signal input terminal of what has been generally denominated as the tuner portion 20 of the receiver system. The tuner 20 is typically of the double superheterodyne type and includes a 75 mHz bandpass filter 22 for receiving radio frequency signals from the antenna 10; a first mixer 24 having an associated oscillator 26 for converting signals passing through the filter 22 to a first intermediate frequency of, say, about 10.7 mHz and delivering the same to a first intermediate frequency amplifier 28; a second mixer 30 having an associated oscillator 32 for converting signals from the output of the amplifier 28 to a lower second intermediate frequency of, say, about 455 kHz and delivering the same to a second intermediate frequency amplifier 34; a demodulating detector 36 for receiving the output from the amplifier 34 and removing the intermeidate frequency carrier component therefrom to present an audio frequency output corresponding to the coded tone group component of the modulated radio frequency signals received from a ground-based marker beacon transmitter; and an automatic gain control circuit 38 including a rectifier 39 for feeding a direct current signal of level corresponding to the amplitude of the audio frequency output of the detector 36 to the I.F. amplifier 34 (and, possibly, also to the I.F. amplifier 28) to control the gain of the latter for providing an audio output intensity of generally the same level from received signals of strengths varying within certain limits.

The audio frequency output from the detector 36 of the tuner 20 is delivered concurrently, by connections as at 41, to each of the three modules 42, 44 and 46, which are commonly referred to as "light circuits". Each of the modules 42, 44 and 46 conventionally includes audio frequency filtering input means for passing only audio frequencies of a particular frequency corresponding to one of the modulation frequencies used to identify the three marker beacons (3000 Hz for the inner beacon and module 42, 1300 Hz for the middle beacon and module 44, and 400 Hz for the outer beacon and module 46), together with an electric indicating lamp and driver amplifier means for illuminating the lamp in response to passage by the associated filter means of audio frequency signals of the frequency to be indicated by the lamp of that module 42, 44 or 46. A test circuit 48 having a normally open manual switch 49 in series therewith is typically provided for checking the integrity of the lamps in all of the modules 42, 44 and 46 by momentarily applying an appropriate voltage from any suitable source thereof as at 47 (or a ground connection, depending upon the internal circuitry details of the modules 42, 44 and 46) to all of the lamps.

The audio frequency output from the detector 36 is also delivered to the audio portion 50 of the receiver system via a connection as at 51. Prior marker beacon receivers have typically employed some conventional type of audio amplifier 52 for receiving and amplifying the audio frequency output from the detector 36, with the output from the amplifier then being fed to a loudspeaker (or headphones) 54 via a connection circuit as at 56 having a normally closed manual switch 57 in series therewith. The switch 57 is typically part of a switch panel utilized for selectively connecting any one or more of the various instruments on the aircraft having an audio frequency output with the loudspeaker or headphones 54. It will also be understood that the switch 57 is the one previously referred to as commonly used by pilots to disconnect the marker beacon receiver system from the speaker or phones 54, once the entry of the aircraft into the reception zone of the outer or middle markers has been indicated by the system.

It remains in connection with the typical prior system depicted in FIG. 1 to consider the manner in which the previously mentioned manual control over receiver sensitivity has been conventionally implemented. The manual switch for such purpose is shown at 61 and will be seen to have a "HI" position represented by the contact 63 and a "LO" position represented by the contact 65. The terminal 67 represents any suitable source of direct current potential of level appropriate for "fooling" the I.F. amplifier(s) 34 (and 28) into "thinking" that the output of the detector 36 is at a relatively high level and that the detector 36 is sending an automatic gain control signal of correspondingly high level back to the intermediate frequency section of the receiver for causing the latter to amplify with a lesser level of gain than would otherwise be appropriate for the level of signals actually being handled. The available connection from the terminal 67 through the contact 65 of the switch 61 proceeds through a conductor 62 coupled with the direct current portion of the A.G.C. circuit 38 of the tuner 20. As intended to be used, the pilot sets the switch 61 to the "HI" position during approach to the outer marker beacon; then, when the system indicates that the aircraft has entered the reception area for the outer beacon, the pilot manually sets the switch 61 to the "LO" position for lowered sensitivity of the receiver until the pilot feels the aircraft should have passed over the outer beacon; then the pilot should restore the switch 61 to the "HI" position for higher sensitivity in detecting entry of the aircraft into the reception area for the middle beacon; with such sequence of manual switch resettings then being repeated as the aircraft traverses the reception area for the middle beacon and approaches the inner beacon. Aside from the apparent burden and distractions of the pilot associated with such conventional manual switching approach, certain more subtle disadvantages also accrue from employing a "false" A.G.C. signal to emulate the effects of true radio frequency sensitivity control. For example, with the prior approach, the ultimate sensitivity of the tuner 20 can be influenced not only by the "false" A.G.C. signal, but also by the real A.G.C. signal derived from the intensity of the signals actually being received at any given time, which makes it difficult if not impossible to accurately adjust conventional marker beacon receiver systems for lowered sensitivity operation at a known predetermined level of radio frequency signal strength, as is most desirable. Another disadvantage of the conventional "false" A.G.C. signal approach is that the extent of reduction in sensitivity brought about by setting the switch 61 to the "LO" position is critically dependent upon the level of the voltage actually provided at the terminal 67, that is, upon an analog type input (as contrasted with true switching of circuitry whose operation depends upon the connection or disconnection of components of known substantially constant value). Also, if the voltage represented by the terminal 67 is derived from a source at all remote from the switch 61, the length of the conductor 62 may subject the sensitivity control function to unpredictable effects of noise and electrical transients. It is noted that the lamp test switch 47 is frequently combined with the switch 61 as a third position of the latter, in manner that will be apparent.

SUMMARY OF THE INVENTION

The improved aircraft marker beacon receiver provided by this invention eliminates all of the above-noted primary disadvantages of prior conventional receivers for the same general purpose by:

(1) Controlling the sensitivity of the receiver to radio frequency signals by an electrically controllable attenuator circuit coupled between the antenna and the input terminal of the tuner portion of the receiver, which operates entirely independently of the internal A.G.C. circuitry of the receiver and employs an electronic device operating in a switching mode to selectively alter the effective shunt impedance of the antenna input circuit between known discreet values to either attenuate or not attenuate incoming radio frequency signals from the antenna to a predetermined and presetable extent;

(2) Controlling both the altering of the sensitivity of the receiver from a high sensitivity state to a lowered sensitivity state and the muting of the audible output from the receiver in direct correlation with the movement of the aircraft from the lower intensity outer portion into the higher intensity central portion of the radiation pattern from a beacon being traversed;

(3) Controlling both the restoration of the sensitivity of the receiver from a lowered sensitivity state to a high sensitivity and the restoration of the audible output from the receiver to an active state on a timed basis such that such restorations occur after the aircraft has completed its traversal of the radiation pattern for each beacon and before the radiation pattern for the next beacon has been reached; and (4) Accomplishing all of the aforementioned control functions completely automatically and without pilot intervention in response to the intensity of the signals actually being received from a marker beacon during traversal of the radiation pattern of the latter.

These and other objects and advantages of the improved receiver and further details concerning the currently preferred construction for the improved receiver will next be discussed with reference to FIGS. 2 and 3 of the drawings.

DESCRIPTION OF THE PREFERRED EMBODIMENT

Figure 1:
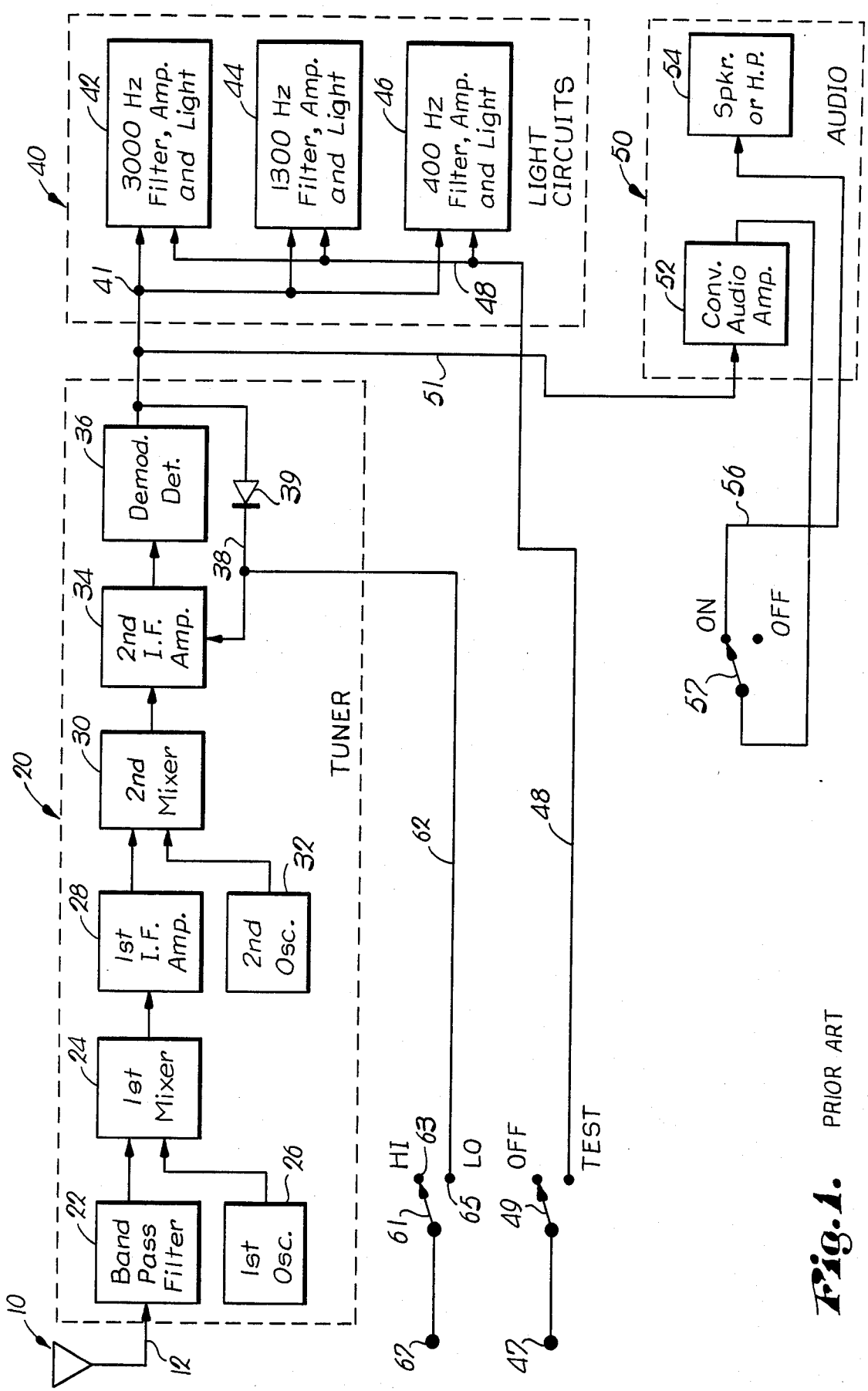
FIG. 1 is a block diagram of an aircraft marker beacon receiver system of the type heretofore available and almost universally employed, which is believed to represent the state of the prior art.
Figure 2:
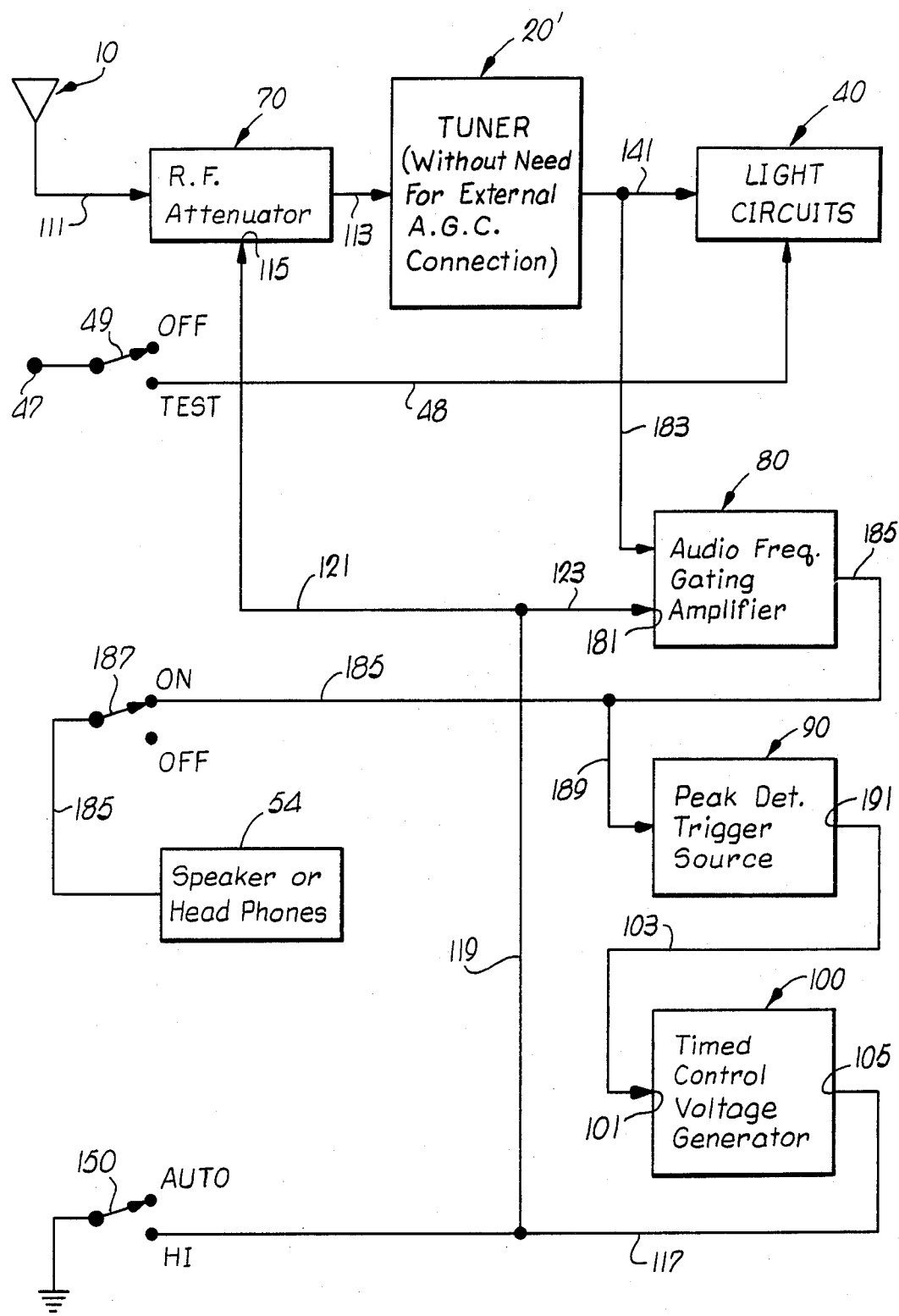
FIG. 2 is a block diagram showing the primary combinational aspects of the improved aircraft marker beacon receiver system provided by this invention.

The block diagram of FIG. 2 of the drawing reveals the broader combinational aspects of the improved receiver, and may enlighteningly be compared with the block diagram of FIG. 1 depicting a conventional prior art receiver for the same application.

In the improved receiver diagrammed in FIG. 2, certain blocks are identified with reference numerals identical to ones employed in FIG. 1 (i.e., the antenna 10, the light circuits 40 and the speaker or phones 54), and, as to those elements, it should be understood that the corresponding elements of the improved receiver may be identical to those previously described for the conventional prior receiver of FIG. 1. Similarly, it will be noted that the tuner of the improved receiver is identified in FIG. 2 by the reference numeral 20', and it should be understood that the tuner 20' of the improved receiver is identical to the tuner 20 previously described in connection with the conventional prior receiver of FIG. 1, except that the tuner 20' has no need for and omits the external connection 62 with the internal A.G.C. circuit 38 required in the tuner 20.

The first element of the improved receiver that departs from prior practice in marker beacon receiver equipment is the radio frequency attenuator 70 that has been added, which permits elimination of the "false" A.G.C. input conventionally heretofore employed. The attenuator 70 has a radio frequency signal input terminal coupled with the antenna 10 as at 111, a radio frequency signal output terminal coupled with the radio frequency input terminal of the tuner 20' as at 113, and a control voltage input terminal as at 115. Internal details of the attenuator will be subsequently described with reference to FIG. 3.

The audio output signal terminal of the tuner 20' is coupled with the signal input terminal of the light circuits 40 as at 141, and the light circuits 40 may have associated therewith a test circuit as at 47, 48 and 49, all in the same manner as previously described for the corresponding parts of the conventional receiver of FIG. 1.

The next difference between the improved receiver and prior conventional marker beacon receivers is that, whereas the latter typically employed a conventional two-terminal audio amplifier 52 for receiving the audio output from the tuner 20, amplifying all of the received audio signals and delivering the same to the speaker or phones 54 (and had no reason to do otherwise), the improved receiver uses a three-terminal operational amplifier 80 for not only performing an audio signal amplifying function, but also to serve as an electrically controllable gating device for either delivering or blocking the delivery of audio signals to the speaker or phones 54, depending upon whether or not a control voltage is being applied to a control voltage input terminal 181 of the op amp 80. The audio signal path from the output terminal of the tuner 20' to the audio frequency signal input terminal of the amplifier 80 is identified by the reference numeral 183, and a path from the signal output terminal of the amplifier 80 to the speaker or phones 54 is labeled 185 in the drawings. It will be noted that a normally closed on-off switch 187 is also depicted as provided in series with the signal path 185, which bears a functionally superficial similarity to the switch 57 of FIG. 1, and which is not surprising since the switch in question is physcially identical and typically is present as a part of the regular audio signal switching panel in the aircraft. What is different, however, is that, whereas the switch 57 must be manually and successively opened and reclosed by the pilot to accomplish audio muting with conventional prior marker beacon receivers, the switch 187 of the improved receiver will remain continuously closed whenever the improved marker beacon system of the aircraft is being used (with audio muting being automatically accomplished in the manner to be further described). Further details of the amplifier 80 itself will also be subsequently discussed with reference to FIG. 3.

The next new element of the improved receiver, from the combinational viewpoint, is a peak detector 90, which converts an audio frequency output of at least a selected minimum magnitude from the amplifier 80 into a direct current trigger signal. A branch 189 of the output lead 185 from the amplifier 80 delivers the audio frequency output from the latter to the signal input terminal of the trigger producing peak detector 90, and the direct current trigger signal output of the latter is delivered at output terminal 191 thereof. The internal details of the peak detector 90 will be further discussed in connection with FIG. 3.

The next additional element in the improved receiver is a timed control voltage generator 100 having a trigger input terminal coupled with the trigger output terminal 191 of the peak detector circuit 90 as at 103, and a direct current control voltage output terminal 105 at which a control voltage output of predetermined duration is presented in response to a trigger signal from the peak detector 90. The internal construction of the control voltage generator 100, including certain additional terminals thereof used for timing purposes and not shown in FIG. 2 will also be further discussed with reference to FIG. 3.

The next aspect of the improved receiver to be observed from FIG. 2 is that the direct current control voltage output, when presented at the output terminal 105 of the timed control voltage generator 100, is delivered both to the control voltage input terminal 115 of the attenuator 70 via leads 117, 119 and 121 and to the control voltage input terminal 181 of the audio frequency gating amplifier 80 via leads 117, 119 and 123. It will be understood that it is such control voltage applied to the attenuator 70 and the gating amplifier 80 which respectively serves to activate the former to reduce the sensitivity of the receiver and to activate the latter to block the passage of audio signals to the speaker or phones 54.

There remains one other aspect of the improved receiver, as depicted in FIG. 2, to be mentioned. That relates to the apparent presence of an "AUTO-HI" switch 150, which really should not be needed when the improved receiver is functioning properly and may be regarded as optional. As will be apparent, if such a switch 150 is used, it will normally be left continuously in its "AUTO" position (which effects no connection), although it could be shifted to its "HI" position to shunt any control voltage from the terminal 105 of the control voltage generator 100 to ground (leaving the attenuator 70 in its non-attenuating or higher sensitivity state and leaving the speaker or phones 54 active). However, there are two reasons why it might be desirable to provide such a switch 150. First, it is conceivable that a particular pilot might prefer to always operate the marker beacon receiver at maximum sensitivity and with the speaker or phones 54 active, at least under adverse radio reception conditions or the like; in essence, if the switch 150 is provided and ever moved into its "HI" position, the improved receiver would then operate quite similarly to the conventional receiver of FIG. 1. Secondly, and probably of more pratical significance until pilots become accustomed to automatic control of marker beacon receivers, is the fact that pilots have for many years been using the "HI-LO" switch 61 of conventional receivers, and it may be reassuring for the improved receivers to provide a similarly appearing switch (even though there really should probably never be any need to actually use it); in the latter context, such a switch 150 could be given an even more similar appearance to the typical switch 61 if provided with a third position for implementing the temporary lamp test function, as is frequently done with the switches 61 of conventional prior receivers.

Figure 3:
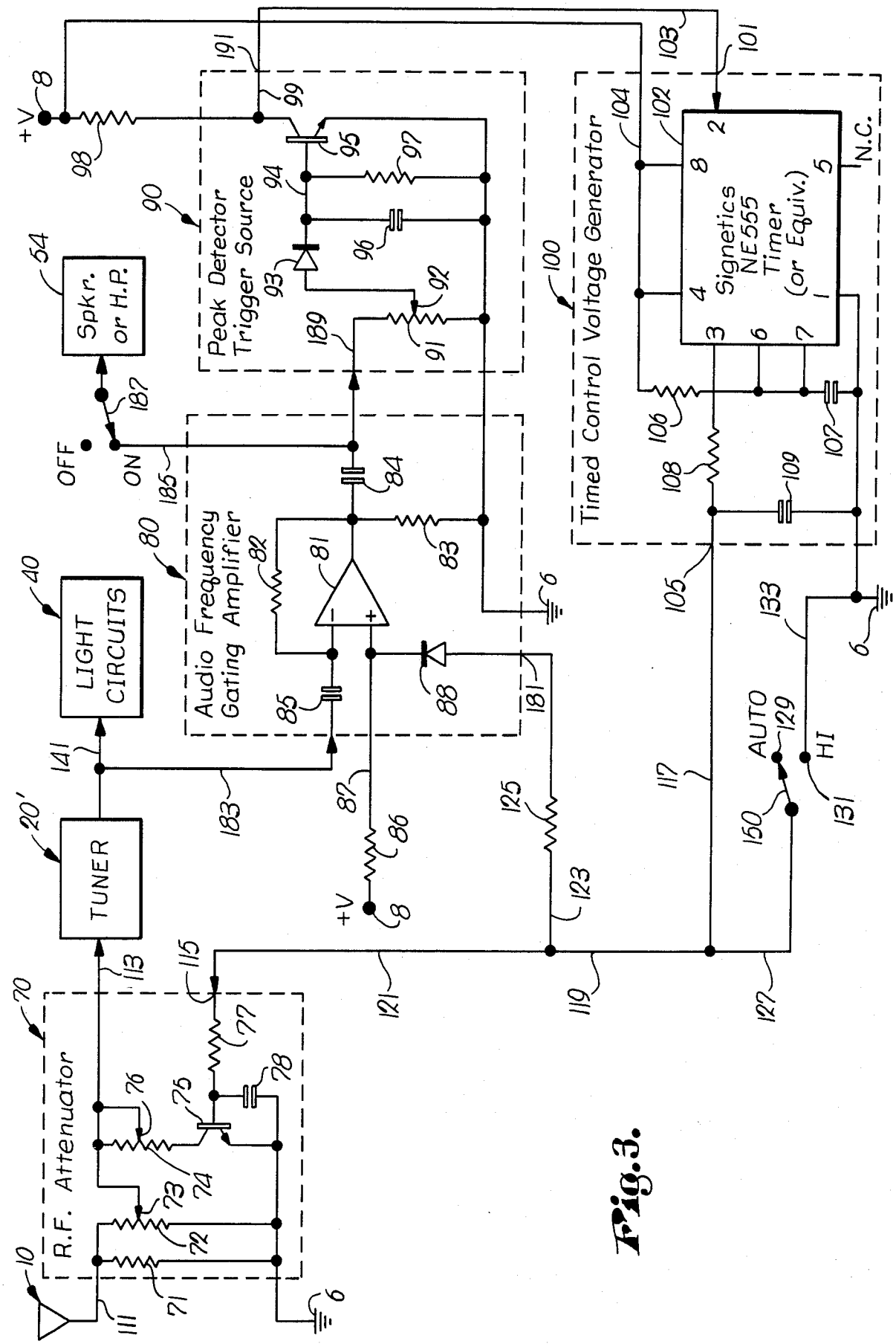
FIG. 3 is a more schematic diagram of the improved system illustrating certain details of the currently preferred construction therefor with greater specificity.

Reference is now made to FIG. 3 for the purpose of further explaining certain of the more detailed aspects of the currently preferred construction for the improved receiver, including the internal circuitry of certain of the modules involved and some observations with respect to proper adjustment of various operating parameters. It will be noted that, in FIG. 3, a system ground is indicated at various places by the reference numeral 6, and that a source of operating potential designated "+V" is represented at various points by terminals 8.

The radio frequency input signals from the antenna 10 to the input terminal 111 of the radio frequency attenuator 70 are fed to a pair of oppositely grounded parallel resistances 71 and 72, the latter of which is provided with a variable tap 73. The resistances 71 and 72 present a resistive input impedance to signals from the antenna 10, which are typically fed to the receiver through a 50 ohm coaxial tranmission line. The tap 73 is coupled with the radio frequency signal output line 113 of the attenuator 70 for applying the received radio frequency signals to the signal input terminal of the tuner 20', either with or without the predetermined attenuation provided by the portion of the circuit next to be described. A variable resistance 74 is coupled with the collector electrode of a solid state, electronically controlled switching component 75 having its emitter electrode grounded, so that the resistance 74 and the collector-emitter internal half of the device 75 provide a shunt path from the output lead 113 to ground for attenuating radio frequency signals on the line 113 to an extent determined by the setting of the tap 76 of the resistance 74 when the collector-emitter path of the device 75 is rendered conductive. The device 75 is thus operated in its switching mode with its base electrode serving as the control terminal thereof. The control voltage input terminal 115 of the attenuator 70 is coupled with the base electrode of the device 75 through a resistance 77, and a grounded decoupling capacitor 78 is provided for the base electrode of the device 75. It will be understood that, in the absence of application to the base electrode of the switching device 75 of a control voltage of predetermined level, the collector-emitter path of the device 75 will remain nonconductive and the shunt path through the resistance 74 and the collector-emitter path of the device 75 will not be attenuating radio frequency signals upon the line 113, thereby maintaining the receiver in a high sensitivity condition. When an appropriate control voltage is applied to the base electrode of the device 75, however, the collector-emitter path of the latter will be switched to a conductive state, so that attenuation of radio frequency signals upon the line 113 occurs in an amount determined by the setting of the adjusted value of the resistance 74.

Suitable values for the resistances 71, 72, 74 and 77 respectively are 100 ohms, 500 ohms, 500 ohms and 10,000 ohms. The decoupling capacitor 78 may be about 470 picofarads. The device 75 may be any suitable switching transister adapted for handling radio frequency signals. In adjusting the improved receiver for operation with existing marker beacon transmitter systems, the tap 73 of the resistance 72 should be set to provide a threshold for activating light circuits 40 when a radio frequency signal of about 200 microvolts is applied to the antenna input terminal 111. The tap 76 of the variable resistance 74 is then set to provide a "light threshold" for activating the light circuits 40 of about 1,000 microvolts of radio frequency input signal when the device 75 is switched into and operating in its conductive state.

The audio frequency gating amplifier 80 utilizes as its primary component a solid state operational amplifier device 81 having an inverting input terminal marked "−" a non-inverting input terminal marked "+" and an output terminal. The op amp circuitry for the gating amplifier 80 conventionally employs a resistance 82 coupled between the inverting and output terminals of the device 81, a grounded resistance 83 coupled with the output terminal of the device 81, and an output coupling capacitance 84 coupled with the output terminal of the device 81. Audio frequency signals are delivered from the output terminal of the tuner 20' to the inverting input terminal of the device 81 via a line 183 and through an input coupling capacitor 85. A reference potential is applied to the non-inverting input terminal of the device 81 through a resistance 86 and lead 87. Provision is made for also applying a control voltage input from the control input terminal 181 to the non-inverting terminal of the device 81 through a blocking diode 88.

Suitable values for the resistances 82, 83 and 86 are respectively 470,000 ohms, 1,000 ohms and 1 megohm. The output capacitance 84 may be about 1 microfarad, and the input capacitance 85 may be of comparable value depending upon the particular operational amplifier component employed to implement the device 81. The level of the reference potential applied to the non-inverting input terminal of the device 81 is, of course, chosen to permit the device 81 to pass and amplify audio frequency signals applied to its inverting input terminal when no control voltage from the terminal 181 is being applied to its non-inverting input terminal, but to cause the device 81 to block the passage of audio frequency signals applied to its inverting input terminal through to its output terminal when a control voltage of predetermined level is applied to the control input terminal 181 of the amplifier 80.

Any audio frequency output signals passed by the gating amplifier 80 are delivered to the speaker or headphones 54 via the output line 185 and the switch 187 (which will typically remain closed whenever the improved receiver is in operation).

Any audio frequency output passed by the gating amplifier 80 is also delivered to the input terminal 189 of the peak detector circuit 90 for producing a trigger input signal in response to application to the input terminal 189 of audio signals of at least an adjustable predetermined level. Within the peak detector module 90, the audio frequency input signals at the input terminal or lead 189 are applied to oppositely grounded resistance 91 having a variable tap 92. The tap 92 is coupled with the input electrode of a rectifying diode 93, which serves to convert audio frequency signals from the tap 92 into a direct current potential at the output electrode of the diode 93. Such direct current potential is applied via a line 94 to the base electrode of a solid state direct current amplifier device 95. The emitter electrode of the device 95 is grounded, and the lead 94 from the output electrode of the diode 93 to the base electrode of the device 95 is coupled with an oppositely grounded capacitor 96 and a resistance 97. The collector electrode of the device 95 is coupled through a resistance 98 with the source of operating potential 8 and with the output terminal 191 of the peak detector module 90 via a lead 99.

Suitable values for the resistances 91, 97 and 98 are respectively 10,000 ohms, 1 megohm and 47,000 ohms. The capacitor 96 may be about 0.1 microfarad. The device 95 may be implemented with any transistor adapted for use as a direct current amplifier at the signal levels involved. The variable tap 92 of the input resistance 91 should be adjusted such that the diode 93 remains conductive until the level of a received radio frequency signal conventionally modulated with marker beacon tone code groups reaches or excedes a threshhold value of about 250 microvolts. It should be understood, therefore, that the module 90 is adapted to produce a direct current trigger signal at its output terminal 191 as an aircraft is traversing the radiation pattern from a ground-based marker beacon transmitter and has penetrated such pattern to an extent such that the intensity of the marker beacon signals have increased to a level at which they may be reliably received by the improved receiver with the latter operating at reduced sensitivity through activation of the attenuator 70 in the manner next described.

The timed control voltage generator 100 can most conveniently be implemented through the use of one of the commercially available solid state circuitry chip devices designed for providing a control voltage output of an appropriate level for a predetermined period of time established by an external resistance-capacitance time constant circuit coupled with terminals of the chip device in response to application to another terminal of the chip device of a direct current trigger signal of appropriate level. A number of such devices are available and well understood by those skilled in the art. For illustrative purposes, however, FIG. 3 depicts such a device 102 as implemented with a Signetics type NE555 timer chip or a functional equivalent thereof marketed by the same or another manufacturer. Since the internal nature of such chip devices is both irrelevant to the improvement of marker beacon receivers claimed herein and a matter of public knowledge, it should be sufficient herein to describe the operation of the device 102 only in functional terms, it being noted that the pin terminal numbers for the type NE555 chip illustrated are shown in FIG. 3.

Pin 1 of the illustrative device 102 is grounded, and a source of operating potential 8 is coupled with pins 4 and 8 thereof via a lead 104. Pin 2 of the device 102 is coupled with the trigger input terminal 101 of the generator 100, which is in turn coupled with the trigger output terminal 191 of the peak detector module 90 by a lead 103. The resistance-capacitance time constant circuit for the device 102, which controls the duration of the control voltage output provided by the generator 100, includes the resistance 106 coupled between pins 4 and 8 of the device 102 and pins 6 and 7 of the device 102, in conjunction with the capacitor 107 that is coupled between pins 6 and 7 of the device 102 and the system ground. The control voltage output generated by the device 102 is presented at pin 3 thereof, which is coupled through a resistance 108 with the control voltage output terminal 105 of the generator 100. An oppositely grounded capacitor 109 is also coupled with the output terminal 105 of the generator 100, which in conjunction with the resistance 108 provides a decoupling filter for any radio frequency signals that might be present upon the connection of the control voltage output terminal 105 of the generator 100 with the control voltage input terminal 115 of the attenuator 70.

It is currently preferred to utilize control voltage signals of approximately 15 seconds duration, and, to that end, suitable values for the resistance 106 and capacitor 107 respectively are about 2.2 megohms and about 6.8 microfarads. Suitable values for the resistance 108 and the capacitor 109 are respectively about 10,000 ohms and about 4.7 microfarads.

The control voltage output terminal 105 of the generator 100 is coupled via leads 117, 119 and 121 with the control voltage input terminal 115 of the attenuator 70 for causing the switching device 75 of the latter to conduct and provide a predetermined amount of attenuation for radio frequency signals passing through the attenuator 70, to reduce the sensitivity of the improved receiver during the period that a control voltage output is presented at the output terminal 105 of the generator 100.

The control voltage output from the terminal 105 of the generator 100 is also applied to the control voltage input terminal 181 of the gating amplifier 80 via leads 117, 119, 123 and a resistance 125 (which may be about 10,000 ohms) for changing the reference potential on the non-inverting terminal of the operational amplifier device 81 to block the passage of audio frequency signals through the latter and thereby mute the speaker or headphones 54 during the duration of the control voltage signal being applied.

Again, the previously discussed optional presence of the "AUTO-HI" switch 150 is depicted in FIG. 3, with the pole element thereof coupled with the control voltage output terminal 105 of the generator 100 via leads 117 and 127, while there is no connection to the "AUTO" contact 129 thereof, and the "HI" contact 131 thereof is coupled with system ground via a lead 133. As earlier herein noted, with the improved receiver of the invention, it is anticipated that there should be little or no occasion for ever moving the switch 150 away from its "AUTO" position, which is essentially, non-functional. On the other hand, it may be noted that, if the switch 150 should ever be shifted into its "HI" position, the effect would be to shunt any control voltage output from the terminal 105 of the generator 100 to ground, thereby maintaining the improved receiver in a continuous state of high sensitivity operation with the automatic control functions of the gating amplifier 80, peak detector 90 and control voltage generator 100, as well as the attenuating capability of the attenuator 70, deactivated.

Those skilled in the art will readily appreciate that a number of minor modifications or variations can be made to the currently preferred embodiment of the improved receiver disclosed for illustrative purposes without departing from the essence of the invention. Accordingly, it is to be understood that the claims which follow should be construed and interpreted in accordance with their natural scope and as including a fair range of equivalents.

I claim:

1. In an aircraft marker beacon receiving and indicating system adapted to respond automatically to proximity of aircraft to beacon and having an antenna for picking up signals in the nature of a radio frequency carrier wave amplitude modulated at a distinctive audio frequency characteristic of the ground-based beacon from which said signals are being transmitted and of an amplitude varying with the disposition of said antenna relative to said beacon, a radio receiver provided with an input terminal adapted to be coupled with said antenna and including means for receiving, amplifying and demodulating said signals to provide an output of said audio frequency at an output terminal of said receiver, audio transducer means adapted to be coupled with said output terminal of said receiver for audibly reproducing said output, and optical indicating means adapted to be coupled with said output terminal of said receiver for visually displaying an aspect of said output, the improvement of which comprises:

radio frequency attenuator means having a radio frequency signal input terminal, a radio frequency signal output terminal and a control voltage input terminal, said attenuator means being operable to attenuate radio frequency signals passing from said signal input terminal thereof to said output terminal thereof by a predetermined amount when a control voltage is applied to said control input terminal thereof and to pass said radio frequency signals without substantial attenuation when said control voltage is not applied to said control terminal thereof;

audio frequency signal gating means having an audio frequency input terminal, an audio frequency output terminal and a control voltage input terminal, said gating means being operable to block passage of audio frequency signals from said signal input terminal thereof to said signal output terminal thereof when a control voltage is applied to said control input terminal thereof and to permit said signals to pass from said signal input terminal thereof to said signal output terminal thereof when said control voltage is not applied to said control input terminal thereof;

audio frequency signal amplitude responsive, trigger signal producing means having an audio frequency signal input terminal and a trigger signal output terminal, said producing means being operable to produce a trigger signal at said output terminal thereof only when the amplitude of audio frequency signals applied to said input terminal thereof is of at least a predetermined level;

trigger signal responsive, timed control voltage generating means having a trigger signal input terminal and a control voltage output terminal, said generating means being operable to generate at said output terminal thereof a control voltage for a predetermined period of time only in response to the application of a trigger signal to said trigger signal input terminal thereof;

means for coupling said antenna with said input terminal of said attenuator means;

means for coupling said output terminal of said attenuator means with said input terminal of said receiver;

means for coupling said output terminal of said receiver with said optical indicating means;

means for coupling said output terminal of said receiver with said signal input terminal of said gating means;

means for coupling said output terminal of said gating means with said audio transducer means;

means for coupling said output terminal of said gating means with said signal input terminal of said producing means;

means for coupling said output terminal of said producing means with said trigger signal input terminal of said generating means;

means for coupling said control voltage output terminal of said generating means with said control voltage input terminal of said attenuator means; and means for coupling said control voltage output terminal of said generating means with said control voltage input terminal of said gating means.

2. The invention of claim 1, wherein:
said attenuator means includes means for adjusting the amount by which radio frequency signals passing from said input terminal thereof to said output terminal thereof will be attenuated when said control signal is applied to said control terminal thereof.

3. The invention of claim 1, wherein:
said attenuator means presents a resistive, substantially non-reactive impedance to radio frequency signals passing from said input terminal thereof to said output terminal thereof and includes an electronic switching component having a pair of electrodes coupled in shunt-to-ground relationship with said output terminal thereof and a third electrode for controlling electrical conduction between said pair of electrodes coupled with said control voltage input terminal thereof.

4. The invention of claim 1, wherein:
said gating means comprises an operational amplifier.

5. The invention of claim 1, wherein:
said producing means comprises signal peak detector means.

6. The invention of claim 5, wherein:
said peak detector means includes an adjustable input resistance, an input signal rectifier and a direct current output amplifier.

7. The invention of claim 1, wherein:
said generating means includes a resistance-capacitance timing constant circuit for controlling the length of said predetermined period of time.

* * * * *